United States Patent [19]
Kobilka

[11] 3,827,077

[45] July 30, 1974

[54] TWO-STAGE CONTACT DUPLICATION OF MAGNETIC SIGNALS UTILIZING A METAL-BACKED INTERMEDIATE

[75] Inventor: Gary W. Kobilka, Saint Paul, Minn.

[73] Assignee: Minnesota Mining and Manufacturing Company, Saint Paul, Minn.

[22] Filed: Feb. 20, 1973

[21] Appl. No.: 333,878

[52] U.S. Cl. ........................ 360/16, 360/59, 360/134

[51] Int. Cl. ............................................ G11b 5/86

[58] Field of Search ............ 179/100.2 E, 100.2 CR; 346/74 MT

[56] References Cited

UNITED STATES PATENTS

| | | | |
|---|---|---|---|
| 3,496,304 | 2/1970 | Nelson | 179/100.2 E |
| 3,632,898 | 1/1972 | Slade | 179/100.2 E |

*Primary Examiner*—Raymond F. Cardillo, Jr.
*Assistant Examiner*—Robert S. Tupper
*Attorney, Agent, or Firm*—Alexander, Sell, Steldt & DeLaHunt

[57] ABSTRACT

Magnetic signals from a master magnetic recording medium are copied onto a copy magnetic recording medium by means of an intermediate transfer medium having a thermally conductive metal backing and a coating of magnetizable material of low Curie temperature and normally high $H_c$. The signals are copied from the master onto the intermediate by thermoremanent contact duplication with the intermediate being cooled by the transfer of heat through the metal backing to a refrigerated surface. Subsequently, the signals are copied from the intermediate onto the copy medium by magnetically stimulated contact duplication.

8 Claims, 5 Drawing Figures

TWO-STAGE CONTACT DUPLICATION OF MAGNETIC SIGNALS UTILIZING A METAL-BACKED INTERMEDIATE

CROSS-REFERENCE TO RELATED APPLICATION

An intermediate transfer medium useful in the present invention is disclosed and claimed in U.S. Pat. application Ser. No. 333,877, filed of even date herewith.

FIELD OF THE INVENTION

This invention relates to method and apparatus for making copies of a recorded master tape on unrecorded magnetic recording tape, and specifically for making copies at high speed by contact duplication. The invention makes use of a novel tape or belt intermediate transfer medium.

BACKGROUND OF THE INVENTION

U.S. Pat. No. 2,738,383 (Herr et al.) teaches that recordings on a master magnetic recording tape may be duplicated by placing face-to-face the magnetizable surfaces of the master tape and an unrecorded copy tape and moving them through a gradually diminishing field such as a magnetic idealizing field. The Herr patent has not been used commercially for making copies of audio tapes, in part because electronic equipment is available for making such copies at high speeds. As for video tapes, high speed electronic copying equipment is considered to be unfeasible so that copies are generally made at low speeds and at a cost which is too great for truly widespread use.

High speed contact duplicating equipment has recently been introduced for video use, but it requires the signals recorded on the master tape to be a mirror image of the signals transferred to a copy. To produce electronically recorded mirror masters requires a special recorder for each of the large variety of recording formats.

There continues to be a need for high speed duplication of asymmetrical video tapes without requiring mirror masters. U.S. Pat. No. 3,496,304 (Nelson, now Re. 27,685) avoids the need for a mirror master by using as an intermediate transfer medium a drum or endless belt having a coating of magnetizable material of low Curie temperature and high $H_c$ (coercivity) relative to the $H_c$ of the copy tape. The Nelson patent includes the steps of (1) heating the magnetizable material of the intermediate to a temperature above said Curie temperature but below the Curie temperature of the master medium, (2) moving the master and the heated intermediate in face-to-face contact while allowing the magnetizable material of the intermediate to cool below its Curie temperature to copy magnetic signals from the master medium onto the intermediate, (3) then separating the master medium from the intermediate, and (4) thereafter moving the copy medium and the intermediate in face-to-face contact through a magnetic field to copy the signals onto the copy medium. Subsequent heating erases the signals from the intermediate to prepare it for repeated cycles.

The Nelson patent lacks sufficient information to enable construction of a practical device. For example, it does not teach how to construct the intermediate and virtually disregards heat transfer problems.

OTHER PRIOR ART

In addition to Herr and Nelson a number of patents relate to contact duplication. U.S. Pat. No. 3,364,496 (Greiner et al.), No. 3,465,105 (Kumada et al.) and No. 3,632,898 (Slade) concern thermal transfer involving heating the copy tape to approximately its Curie temperature and No. 3,472,971 (van den Berg) concerns magnetically stimulated copying. Each of these by itself would require a mirror master tape for copying asymmetrical tape recordings.

THE PRESENT INVENTION

The present invention employs the general approach of the Nelson patent but solves the problems which Nelson left unanswered. In doing so, the present invention achieves commercially practical copying from master magnetic recording media onto copy magnetic recording media, without the need for making mirror masters of asymmetrical recordings. Like Nelson, the system of the present invention employs an intermediate transfer medium having a face of magnetizable material of low Curie temperature (e.g., 50°–170° C) relative to that of the master medium and high $H_c$ relative to the $H_c$ of the copy medium, but in the present invention, the intermediate is a tape or endless belt having a metal backing of low permeability. Similar to Nelson, the system includes means for heating the magnetizable material of the intermediate to a temperature $T_1$ approximating, and preferably exceeding, its Curie temperature but below the Curie temperature of the master medium. As in Nelson, the system includes means for moving the master medium and the heated intermediate in face-to-face contact while allowing the magnetizable material of the intermediate to cool below its Curie temperature to copy the magnetic signals from the master medium onto the intermediate. Both systems then provide for separating the master medium from the intermediate. However, the system of the present invention has a rotating surface which is refrigerated to withdraw from the intermediate at least $AvdC(T_1-T_2)$ calories per second where A is the cross-sectional area in cm$^2$, v is the velocity in cm/sec., *d* is density in gm/cm$^3$, C is the specific heat in calories per gram, and $T_2$ is the temperature of the intermediate when it leaves the refrigerated rotating surface. In the novel system, the means for moving the master medium includes means for forcing the master medium against the heated intermediate and the intermediate in turn against the refrigerated rotating surface to cool the magnetizable material of the intermediate by conducting heat away through the metal backing. Finally, as in Nelson, the system includes means for moving the copy medium and the separated intermediate in face-to-face contact through a magnetic field for stimulating the magnetizable material of the copy medium to copy the signals onto the copy medium.

Because the temperature of the intermediate at the master station is higher than at the copy station, it is desirable to compensate for dimensional changes by subjecting the copy medium to less tension than that on the master medium so that the master medium is slightly stretched with respect to the copy medium.

The system of the present invention may include one or more copy stations, and the magnetic idealizing field at each copy station should be at least 50 oersteds (Magnetic values are here measured at 20°–25° C using a 60-Hz 3,000-oersted peak applied field) less than the $H_c$ of the magnetizable material of the intermediate so that the signals carried by the intermediate are essentially unaffected upon being duplicated. In a preferred embodiment of the invention, the intermediate is an endless belt which is reheated above the Curie temperature to erase the magnetic signals and prepare the intermediate to receive additional signals from the master medium.

The metal backing of the intermediate is preferably a nonmagnetic metal such as beryllium copper or stainless steel which is strong, withstands repeated heating and cooling without damage and can be used for long periods without appreciable deterioration. A metal backing provides good thermal conductivity, permitting the magnetizable coating to be heated and cooled by contacting the reverse side of the intermediate successively with heated and cooled drums. Improved heat transfer is attained by applying a light coating of grease onto the drum surfaces.

The metal backing should be thin (e.g., 0.025–0.15 mm) in order to minimize thermal transfer requirements and to minimize the spacing between the source of the magnetic idealizing field and the magnetizable face of the copy medium at the copy stations if the source is located on the opposite side of the metal backing. Preferably the metal backing has a thickness of at least 0.075 mm to make it easier to handle without wrinkling, easier to guide from its edges, and easier to splice if the intermediate is spliced. The backing preferably has sufficient strength to permit it to be operated under moderately high tension, preferably at least 2 kg per cm of width. Then if the intermediate is unsupported at either position at which it is contacted by the master and copy media, a device such as a roller can force the medium against the tension in the intermediate and beyond the normal path of the intermediate to afford intimate contact between the medium and the intermediate.

The magnetizable face of a preferred intermediate for the present invention is approximately $M_2P$ where P is primarily phosphorous and M consists essentially of a combination of at least two transition metals providing a $B_r$ (remanent flux density) of at least 1,500 gauss, an $H_c$ of at least 500 oersteds and a Curie temperature of 50°–350° C. In view of the trend toward recording tapes of higher $H_c$ and $B_r$, the magnetizable face of the intermediate preferably has a $B_r$ of at least 1,800 gauss and an $H_c$ of at least 1,500 oersteds at ordinary room temperature (20°–25° C.). An intermediate having these preferred magnetic values would behave as if it had even higher magnetic values if the copying is carried out at subnormal temperature.

Thus far, the highest magnetic values have been attained with sputtered coatings of approximately $M_2P$ where M is 80–90 mole percent iron, 10–20 mole percent cobalt and 0–5 mole percent nickel. Increased Curie temperature can be obtained by including small amounts of arsenic or boron with the phosphorous. In order to realize the preferred magnetic values mentioned above, it may be necessary to heat the sputtered coating to a temperature above 200° C either during or after the sputtering. Good results have been attained by allowing the backing member to be heated to 300° C during the sputtering or if the temperature is lower during sputtering, by postheating the medium in a vacuum or an argon environment to 400°–500° C. Hence, the backing member is desirably a metal.

While it is preferred that the magnetizable material of the intermediate be binder-free since this permits a desirably high $B_r$, coatings of magnetizable particles in nonmagnetizable binder may be employed. In the present state of the art, $CrO_2$ would necessarily be so used, because techniques for applying binder-free coatings of $CrO_2$ have not been developed. In addition to sputtering, binder-free coatings may be applied by vapor coating, flash evaporation or plating.

A preferred intermediate for the present invention has been made using an endless belt formed from beryllium copper (CDA 172 full hard) of 150 cm length, 3.2 cm width and 0.1 mm thickness. In order to provide true edges, about 20–30 strips of the backing were clamped together, their edges were milled to be parallel within 0.001 cm per cm of length of the strips, and their ends were milled to be parallel within 0.001 cm per cm of width. The ends of each strip were fused together by electron-beam butt welding to provide an endless belt. By polishing the splice with abrasive sheets of successively finer grit followed by polishing the whole belt with an abrasive paste, a finish of about 0.05 micrometer (root mean square) was attained.

The belt was mounted on pulleys of sputtering apparatus as described in the aforementioned U.S. Pat. application Ser. No. 333,877. together with an ingot target of essentially $(Fe_{0.85}Co_{0.15})_2P_{1.1}$, the excess phosphorous allowing for some loss during sputtering. As disclosed in that application, the pressure was reduced to about $5 \times 10^{-6}$ torr and the filament was heated to its normal operating condition of 50 amps, 20 volts AC, after which argon gas was introduced, increasing the pressure to about $10^{-2}$ torr. A positive potential of about 200 volts above the filament was applied to the anode, producing and igniting a gaseous discharge. At equilibrium the anode operated at 3.4 amps and 61 volts DC.

While the belt was driven at 1.8 cm/min., a negative DC potential of 135 volts was applied to the target, and a negative DC potential of 175 volts (both with respect to the anode) was applied to the belt during one pass of the belt to prepare the outer surface of the belt for a sputtered coating. Then while shielding the belt with a shutter, the negative DC potential of the target was increased to 1,580 volts for 20 minutes to clean the target and to bring its temperature and the environs to a steady state condition. Then the negative DC potential at the belt was reduced to 3.4 volts, the shutter was opened, and sputter deposition of the phosphide target onto the outer surface of the belt proceeded for about 3 hours, or slightly more than two complete belt passes. The final phosphide coating [believed to be essentially $(Fe_{0.85}Co_{0.15})_2P$], had a thickness of approximately 0.6 micrometer and exhibited a $B_r$ of 1,800–2,000 gauss, an $H_c$ of 1,600–2,000 oersteds and a Curie temperature of 110°–140° C. The first time a target is used, the Curie temperature tends to be at the lower end of that range, and in the later runs, the Curie temperature tends to be at the higher end. In some cases the identical conditions produced an inexplicably lower $H_c$, sometimes only about 1,200 oersteds. For use in the present invention, the room temperature $H_c$ of the intermediate should be at least twice the coercivity of the copy tape unless their magnetizable materials are highly uniform. Ordinary video tapes have coercivities of 300–350 oersteds, but the $H_c$ of some commercial video tapes is 500–700 oersteds. Hence, it is preferred that the $H_c$ of the intermediate be at least 1,000 oersteds, or better, at least 1,500 oersteds. Preferably the $B_r$ is at least 1,600 gauss. Since the intermediate preferably is heated about 20° C above the Curie temperature at the time it contacts the master medium, it is preferred that the Curie temperature is no higher than 160° C to insure against damage to the master medium.

When the above-described belt was used in the practice of the present invention, the splice did not produce any discontinuity that was visually detectable upon viewing copied video signals. Care should be taken to prevent the accumulation of lint or other debris on the magnetizable surface of the intermediate.

The best copying has been achieved when using as the master medium a polyester-backed tape having a coating of magnetizable particles prepared in accordance with claim 6 of U.S. Pat. No. 3,573,980 and having more than 600 oersteds $H_c$ and 1,500–2,000 gauss $B_R$.

THE DRAWING

DETAILED DESCRIPTION OF PREFERRED EMBODIMENT

Figure 1:
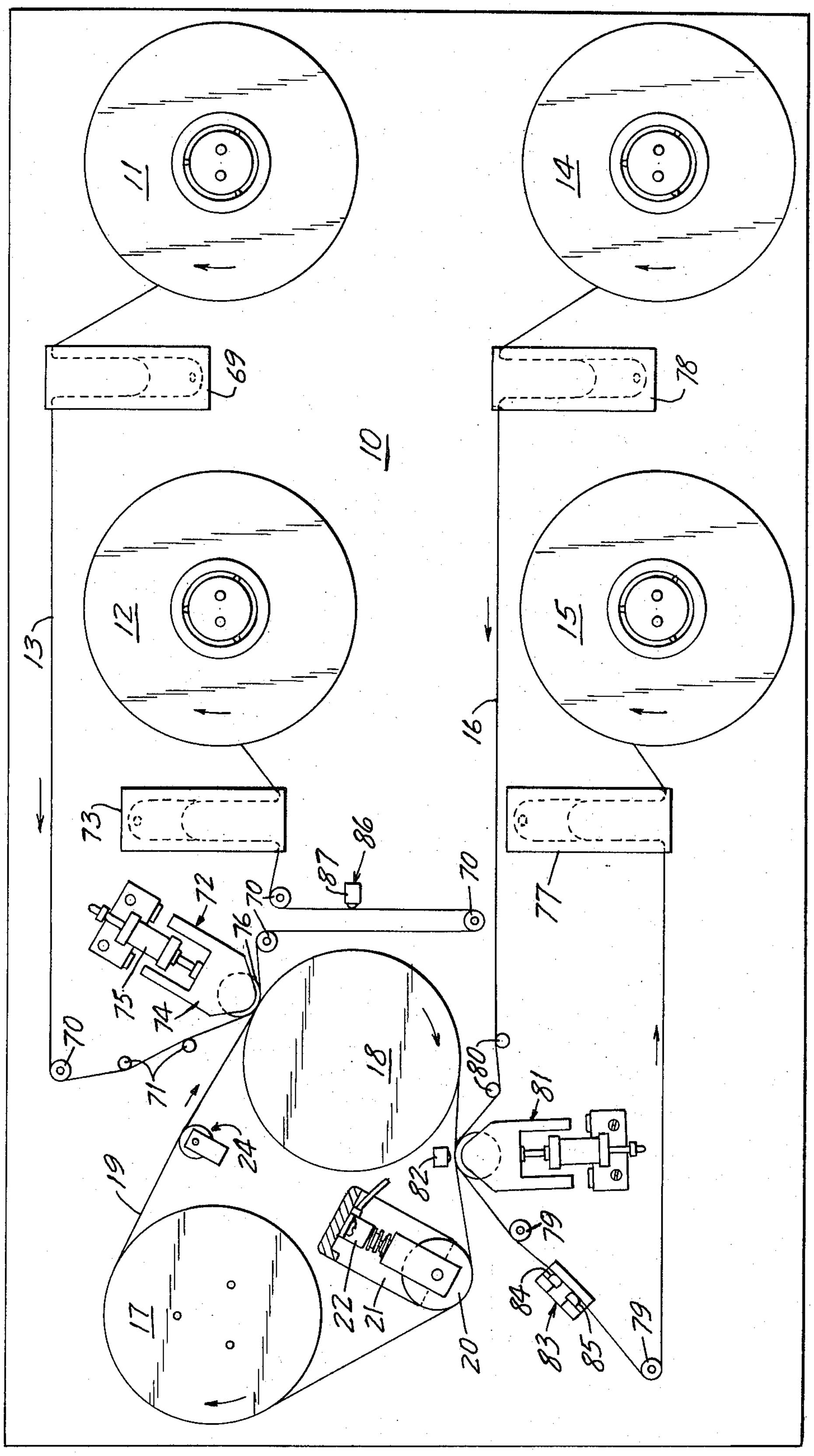
FIG. 1 is a schematic plan of apparatus embodying the present invention.

Referring to FIG. 1, a stress-relieved cast aluminum deck 10 has been machined with precision so that each part which attaches to the deck can be accurately mounted within 0.05 mm of a horizontal plane. Journalled in the deck 10 are spindles for a supply reel 11 and a take-up reel 12 for a master tape 13, spindles for a supply reel 14 and a takeup reel 15 for a copy tape 16, and guide rolls for these tapes. Also journalled in the deck 10 are a hot drum 17 and a cold drum 18. An endless metal belt 19, constructed as described above, is carried by the hot drum 17, the cold drum 18 and a stainless steel tensioning roll 20 on a carriage 21 which is slideably mounted on the deck 10. An air-actuated piston 22 urges the carriage 21 and tensioning roll 20 outwardly to subject the belt 19 to a fixed tensioning tension of about 11 kg.

Figures 2, 5:
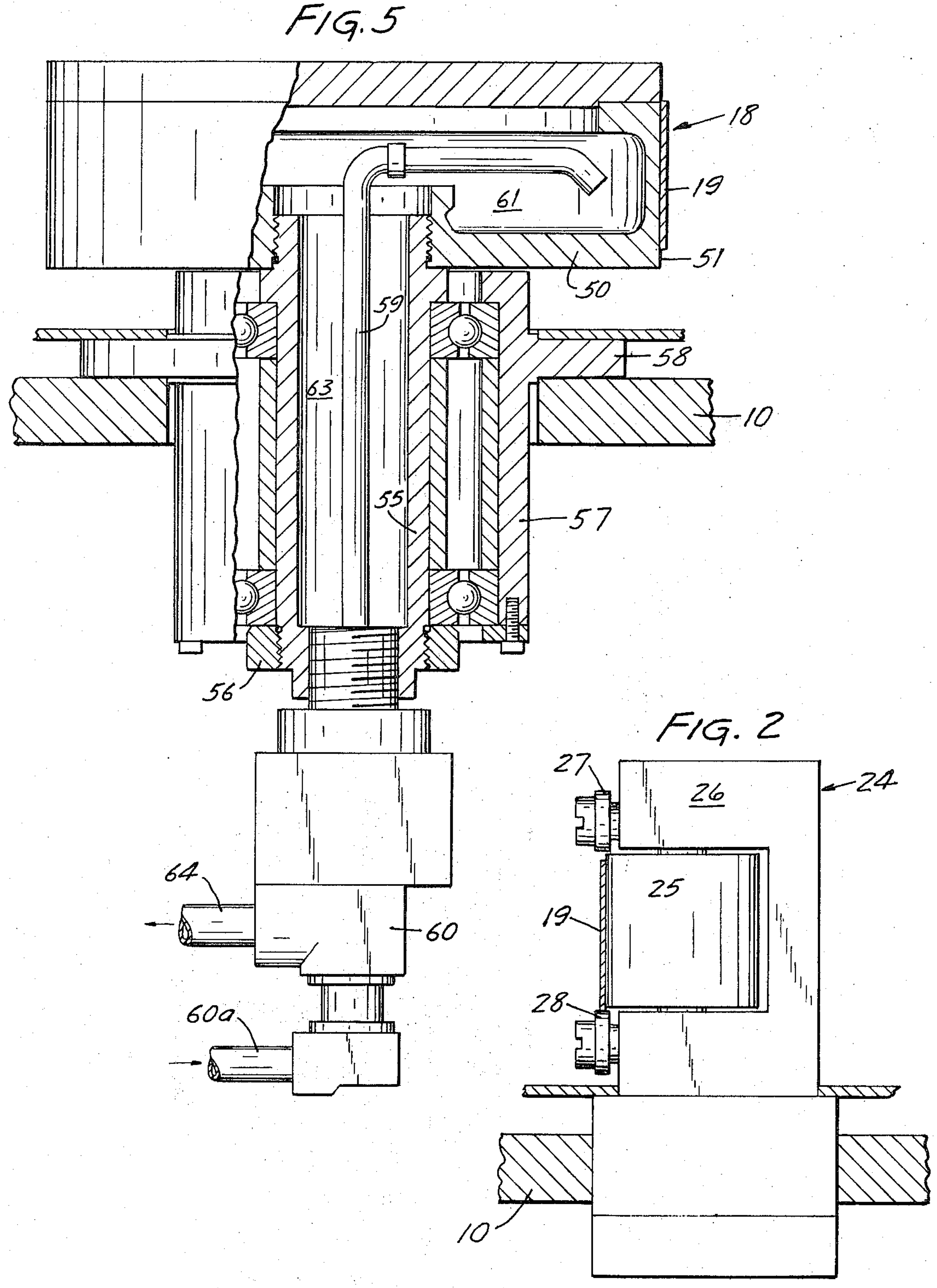
FIG. 2 is an enlarged elevation showing the belt-guiding assembly employed in FIG. 1.
FIG. 5 is a central section showing the cold drum employed in FIG. 1.

The belt 19 also passes over a belt-guiding assembly 24 which is fixed to the deck 10. Referring to FIG. 2, the belt-guiding assembly includes a stainless steel cylinder 25 of 3.2 cm diameter and a length equaling the width of the belt 19. The cylinder 25 is journalled at both ends to a block 26 fixedly mounted on the deck 10. Also journalled to the block 26 are a pair of stainless steel rollers 27, 28, each of which is 6 mm wide and 1.25 cm in diameter. The cylindrical surface of each roller 27, 28 is spaced approximately 0.025 mm from one end of the cylinder 25, and when the belt 19 moves either upward or downward, an edge of the belt strikes one of the rollers 27, 28 to maintain the belt substantially in tangential contact over the entire length of the cylinder 25.

Figures 3, 4:
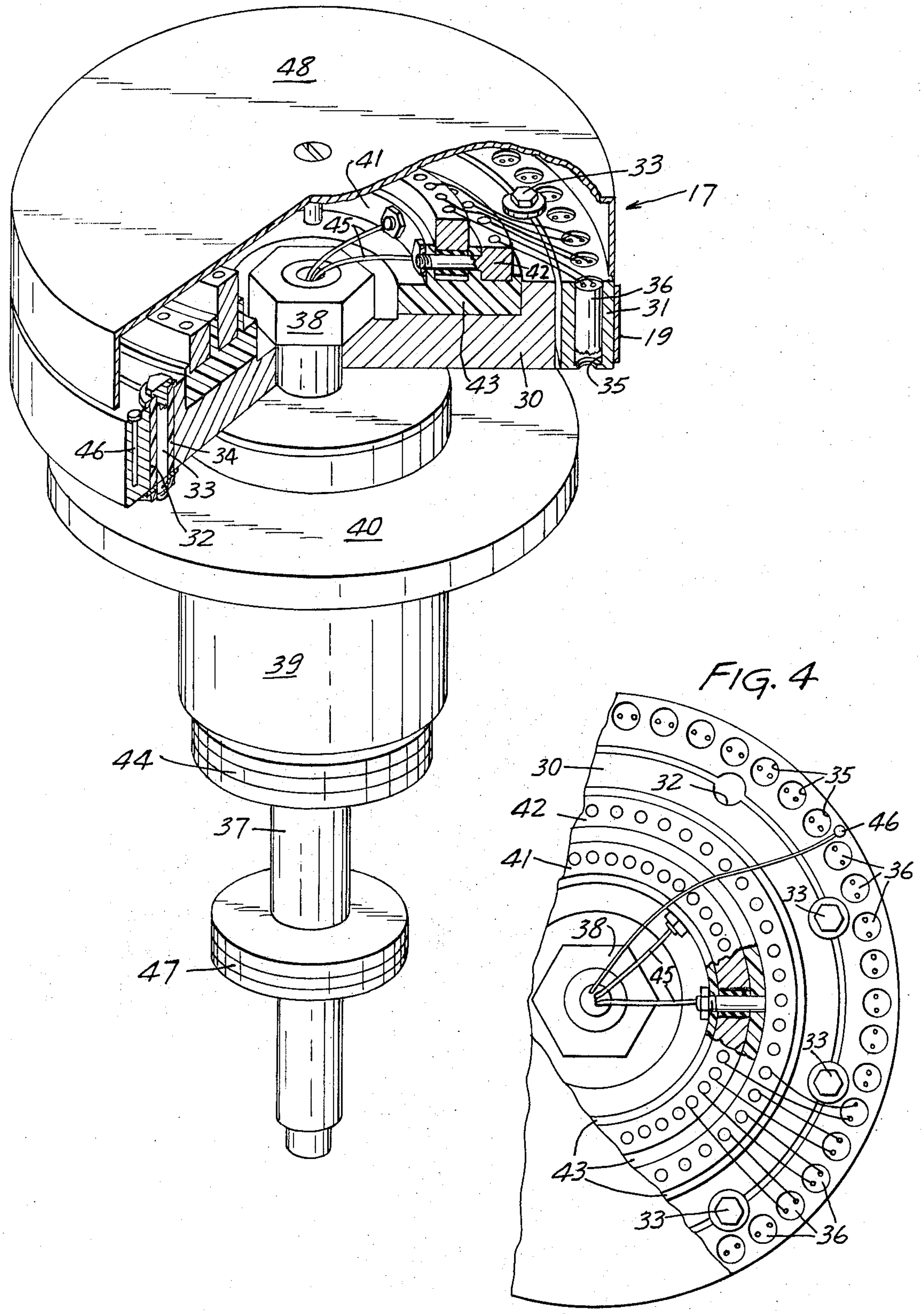
FIG. 3 is an isometric view showing the hot drum employed in FIG. 1, which view is cut away in part to a central section to reveal details of construction.
FIG. 4 is a top view of the hot drum with the protective cover removed.

Referring to FIGS. 3 and 4, the hot drum 17 comprises two separate rings, namely, a 17.5 cm diameter aluminum support ring 30 and an aluminum annular ring 31 of 20 cm inside diameter and 25 cm outside diameter. While clamped in the position shown, nine holes 32 are bored in the two rings 30, 31, which holes are centered on the space between the rings. The two rings are then secured together by bolts 33 which are insulated from the rings by polytetrafluoroethylene ("Teflon") grommets 34. The Teflon grommets expand into the holes 32 upon tightening to rigidly secure the annular ring 31 to the support ring 30. The support ring in turn is firmly held by a hollow threaded shaft 37 and hex nut 38 against a bearing assembly in a bearing housing 39 that is formed with a collar 40 which is bolted against the top of the deck 10 (not shown in FIG. 3).

The annular ring 31 has 45 1.25 cm bores 35, each containing a resistance heater 36 (Ogden Model MW 515-2 12-1, 130 watts, 240 volts). Current to the heaters 36 is supplied from circular junction blocks 41, 42 which are bolted to an insulating disk 43, preferably formed from Teflon, which in turn is bolted to the support ring 30. Current is supplied to the junction blocks from conventional slip rings 44 via insulated wires 45. A protective cover 48 is bolted to the insulating disk 43.

At the periphery of the annular ring 31 are a pair of bores 180° apart, each containing a thermistor 46, the leads to which pass through the hollow shaft 37 to a second set of slip rings 47. One of the thermistors 46 is connected to a thermostat (not shown) for controlling the current to the heaters 36 and the other is connected to a safety mechanism, which only includes means for absolutely shutting off power to the heaters if the temperature exceeds a safe maximum. The thermostat is so adjusted that the belt 19 is heated to at least 20° C above the Curie temperature of its magnetizable coating at the time the belt reaches the cold drum 18.

Referring to FIG. 5, the cold drum 18 includes an aluminum jacket 50 formed with a cylindrical outer surface 51 which is 25 cm in diameter. The jacket 50 is threaded to the upper end of a hollow stainless steel shaft 55 which also is threaded at its lower end. A nut 56 secures the shaft 55 to a bearing assembly in a bearing housing 57 that is formed with a collar 58 bolted to the deck 10.

A stainless steel tube 59 which extends centrally through the hollow of the shaft 55 carries a refrigerant (e.g., "Freon" R 12) upwardly from a dual port rotary union 60 having an inlet 60*a*, and sprays it into the circular space 61 within the jacket 50. The vaporized refrigerant then travels downward through the space 63 between tube 59 and the wall of the shaft 55 to an outlet 64 of the rotary union 60. The inlet 60*a* and outlet 64 are connected to conventional refrigeration apparatus (not shown). The refrigeration capacity and the rate of coolant flow should be sufficient to maintain the temperature of the belt-contacting surface 51 at about 10°–25° C during operation of the apparatus.

Referring again to FIG. 1, the master tape 13 passes from the supply reel 11 to a conventional vacuum column 69, a guide roll 70, a pair of vertically adjustable pin guides 71, around a nip roll assembly 72 and a series of additional fixed guide rolls 70 to another vacuum column 73 and the takeup reel 12. The nip roll assembly 72 comprises a carriage 74 which is slideably mounted on the deck 10, an air-actuated piston 75 which drives the carriage, and a rubber covered nip roll 76 which is journalled to the carriage 74. As the master tape 13 passes over the nip roll, the master tape 13 may be moved by the piston into contact with the belt 19, the position shown in FIG. 1.

The nip roll assembly 72 is so positioned that the nip roll 76 and master tape 13 contact the belt 19 before the belt contacts the cold drum 18 and moves the belt slightly beyond its normal path. Thus, the master tape 17 is forced against the tension in the heated belt. Almost immediately thereafter the belt contacts the refrigerated surface 51 of the cold drum and its magnetizable face is quickly cooled below its Curie temperature. The belt 19 and master tape 13 are in contact through about 4° of arc of the cold drum before being separated, and during this contact magnetic signals are copies from the master tape onto the belt. The illustrated apparatus is pre-set to operate at either 100 or 200 cm per second and when run at 100 cm per second, the master tape is only being heated for about 0.008 second and is simultaneously being cooled during much of that short period. Even so, some master tapes might be damaged by the heat. After separation from the master tape the belt continues to travel along the cold drum 18 to cool it to about room temperature before passing to the copy station.

The mechanism for handling the copy tape 16 is similar to that of the master tape 13 in that it includes a pair of vacuum columns 77, 78, a series of guide rolls 79, and a pair of pin guides 80 which are vertically adjustable. The copy tape can be pressed against or retracted from the belt 19 by a nip roll assembly 81 which is identical in construction to the nip roll assembly 72. In the contacting position, the back side of the belt is moved by the nip roll assembly 81 to a spacing of about 0.025 mm from a fixed magnetic stimulator 82 which provides a magnetic idealizing field substantially confined to the area of contact between the belt 19 and the copy tape 16.

With both nip roll assemblies 72, 81 in the projected position, the belt 19 is moved laterally a short distance. Since the piston 22 applies constant pressure to the belt, the carriage 21 retracts slightly. However, the tension in the belt 19 applied by the piston 22 is sufficient to insure intimate contact with the belt by both the master tape 13 and the copy tape 16.

The vacuum columns 69, 73, 77 and 78 are of conventional construction. In each, a vacuum draws the tape to a central position at which the tape acts as a partial shutter for a photoelectric system (not shown) that controls the speed at which the nearest reel 11, 12, 15 and 14, respectively, is driven. When the tape is drawn below or above the center of vacuum column 69, the supply reel 11 is respectively slowed or accelerated until the tape returns to the central position.

Although the illustrated apparatus provides copies of video signals of good quality, the audio and control track signals are copied somewhat less effectively. Accordingly, a head assembly 83 positioned adjacent the copy tape 16 includes a head stack 84 containing at least one audio erase head plus one control-track playback head and a head stack 85 containing an audio record head for each audio track plus a control-track record head. Another head assembly 86 is positioned adjacent the master tape 13 and includes a heat stack 87 having an audio playback head for each audio track. The linear distances from the nip roll 76 are equal when measured along the master tape to the playback head stack 87 and when measured along the belt in the forward direction to the nip roll assembly 81 and thereafter along the copy tape 16 to the record head stack 85. Both head assemblies 83 and 86 are adjustable for azimuth, elevation and horizontal positioning along the tape paths.

The illustrated apparatus employs five drive motors (not shown). Four of these drive the reels 11, 12, 14, 15. The fifth motor drives the hot drum 17 at circumferential speeds of up to 3.8 meters per second. The tension in the belt 19 applied by the tensioning roll 20 is such that the belt moves at the speed of the drum without slippage. When the nip roll assemblies 72 and 81 engage the master and copy tapes 13, 16 with the belt 19, the tapes are driven by the belt at the speed of the belt, and each of the supply and takeup reels responds under the sole control of the nearest vacuum column. The vacuum column 78 is adjusted to ease the tension in the copy tape 16 with respect to the master tape in order to compensate for thermally caused dimensional differences as noted hereinabove.

OPERATION

Preliminary to operation, the heating for the hot drum 17 and the cooling for the cold drum 18 are started; the piston 22 is energized to put the belt 19 under tension; the master and copy tapes 13, 16 are threaded in paths extending across the mouths of the vacuum columns with their magnetizable faces outward; and the head stacks 84, 85 and 87 are disabled. When the drums 17, 18 both reach operating temperature, an indicator light (not shown) advises that the copying operation can begin. The operator presses the start button (not shown) which actuates the reel drives, the vacuum columns 69, 73, 77 and 78 and a time delay mechanism (not shown), and energizes the nip roll assemblies 72, 81 to engaged positions. As the tape is drawn into the vacuum columns, their photoelectric systems control the associated reels to pay out and take up tape as required. When the tape is drawn to about 25 percent of the depth of each vacuum column, a phototransistor (not shown) senses the presence of the tape. Upon receipt of such indications from all four phototransistors, the system is enabled and begins to operate at the end of the preset period of the time delay mechanism, the present period having been been previously adjusted to the time normally required for the tapes to reach central positions in the vacuum columns.

At the end of the preset period of the delay mechanism and subject to enabling indications from the phototransistors of all four vacuum columns, the drive motor for the hot drum 17 is energized, and the tapes reach operating speed within one second. If one of the tapes should break, the tape immediately pulls out of one of its associated vacuum columns, and the resulting loss of enabling signal from the phototransistor of that vacuum column shuts down the operation.

In the initial operation of the apparatus, a master tape bearing a constant amplitude audio tone is used for adjustment of tape alignment. A portion of the signals duplicated on the copy tape is made visible by applying a suspension of superfine carbonyl iron powder in a solvent such as methyl alcohol and a wetting agent such as "Nekal" detergent which do not damage the magnetizable coating. The pin guides 71 and 80 are adjusted for any offset in the duplicated signal placement, and the procedure is repeated until the visual examination indicates approximately correct alignment. Final adjustment of the pin guides 71 and 80 is determined electronically using an appropriate video recorder.

If the apparatus is equipped with audio-track and control-track re-record functions, the head assembly 86 is adjusted for azimuth and elevation to achieve maximum playback amplitude. The re-record functions are energized and carbonyl iron powder is used to examine the re-recorded track locations. The head assembly 83 is adjusted for elevation and azimuth, and the head stack 84 is positioned horizontally such that the rerecorded control-track signals appear to be in the proper location, thus spacing the control-track record head from the control-track playback head by an integral number of the control-track signals. Final positioning of the heads is determined using an appropriate video recorder.

In full operation, heat from the hot drum 17 is conducted through the belt 19 to heat its magnetizable face somewhat above its Curie temperature, and signals on the master tape 13 are duplicated as a mirror image on the magnetizable face of the belt 19 while the belt, in face-to-face contact with the master tape, is cooled below the Curie temperature by conducting heat away through its metal backing. When the cooled belt 19 contacts the blank copy tape 16, the signals are duplicated as a second mirror image on the magnetizable layer of the copy tape by virtue of the field applied by the magnetic stimulator 82. As the copy tape passes the head stack 84, the duplicated audio signals may be erased to permit electronic recording through the record head stack 85 of audio signals reproduced from the master tape 13 at the playback head stack 87.

The above-described apparatus is preset to operate at certain fixed speeds with appropriate audio re-recording equalization for each speed. Any increase in speed requires increased heating and cooling, and the rate at which heat must be carried away during the cooling step can become very appreciable. When using the beryllium copper belt having the $(Fe_{0.85}Co_{0.15})_2P$ coating as described above, the minimum cooling capacity should be at least 400 calories per second based on the formula $AvdC(T_1-T_2)$ where $A = 0.0032$ cm$^2$
$V = 100$ cm/second
$d = 8.22$ gm/cm$^3$
$C = 0.10$ calories/g° C
$T_1 = 170$° C
$T_2 = 20$° C. Since a velocity $v$ of 50 cm/second should be more than adequate for commercial purposes and the density $d$ and specific heat C of the most suitable metals are close to those of beryllium copper, a cooling capacity of at least 200 calories per second should be sufficient where the cross-sectional area of the belt is about 0.003 cm$^2$. Where $v$ is exceedingly high, an inordinate proportion of the total time may be spent in mounting, threading and demounting the tapes, so that a peak velocity of 400 cm per second should be sufficient for any purpose.

When the master tape is rewound for reuse, the nip roll assembly 72 is retracted and the vacuum column 69 is disabled to permit the supply reel 11 to be rotated at high speed. The vacuum column 73 remains in use during rewinding to prevent tape spillage and to sense for tape breakage. Rewinding speeds of about 600–700 cm per second are readily attained.

I claim:

1. In a system for making direct-image copies of magnetic signals from a master magnetic recording medium onto a copy magnetic recording medium, each of which has a magnetizable face, which system includes 1. an intermediate having a face of magnetizable material which has a low Curie temperature relation to that of the master medium and high $H_c$ relative to the $H_c$ of the copy medium,
2. means for heating the magnetizable material of the intermediate to a temperature $T_1$ approximating its Curie temperature but below the Curie temperature of the master medium,
3. means for moving the master medium and the heated intermediate in face-to-face contact while allowing the magnetizable material of the intermediate to cool below its Curie temperature to copy the magnetic signals from the master medium onto the intermediate,
4. means for subsequently separating the master medium from the intermediate, and
5. means for moving the copy medium and the separated intermediate in face-to-face contact through a magnetic field for stimulating the magnetizable material of the copy medium to copy the signals onto the copy medium, the improvement comprising:
   a. said intermediate is a tape or endless belt having a metal backing of low permeability,
   b. cooling means including a rotating surface which is refrigerated to withdraw from the intermediate at least $AvdC(T_1-T_2)$ calories per second where A is the cross-sectional area in cm$^2$, $v$ is the velocity in cm/sec., $d$ is density in gm/cm$^3$, C is the specific heat in calories per gram, and $T_2$ is the temperature of the intermediate when it leaves the refrigerated rotating surface, and
   c. said means for moving master medium includes means for forcing the master medium against the heated intermediate and the intermediate in turn against the refrigerated rotating surface to cool the magnetizable material of the intermediate by conducting heat away through the metal backing.

2. Improvement as defined in claim 1 wherein said means for cooling is a refrigerated drum and the metal backing of the intermediate rides directly on the refrigerated drum.

3. Improvement as defined in claim 1 wherein the means for heating is a heated drum and the metal backing of the intermediate rides directly on the heated drum.

4. Improvement as defined in claim 1 wherein the intermediate is unsupported at the position at which it is first contacted by the master medium and the system further includes means for maintaining the intermediate under tension, said means for moving the master medium including means for forcing the master medium against the tension in the intermediate forwardly of the point at which the intermediate normally first contacts the rotating surface.

5. Improvement as defined in claim 1 wherein the intermediate is unsupported at the position at which it is contacted by the copy medium and the system further includes means for maintaining the intermediate under tension, said means for moving the copy medium including means for forcing the copy medium against the tension in the intermediate and beyond the normal path of the intermediate.

6. Improvement as defined in claim 1 for use with a video tape master medium and further comprising:

d. a playback head or heads positioned for electronic reproduction of the audio track or tracks of the master medium, and e. a record head or heads positioned to record on the audio track or tracks of the copy medium the signals electronically reproduced from the audio track or tracks of the master medium, at least one of said playback and record heads being adjustable longitudinally with respect to its associated medium to permit the heads to be positioned so that the distance from the point of copying signals from the master medium measured along the master medium to the playback head or heads equals the distance from that point to the record head or heads measured along the intermediate until it meets the copy medium and thereafter along the copy medium.

7. Improvement as defined in claim 1 wherein the cooling means is refrigerated to withdraw from the intermediate at least 200 calories per second.

8. Improvement as defined in claim 7 wherein the metal backing is copper alloyed with a small amount of beryllium, the magnetizable material has a Curie temperature of 110°–140° C, and $A = 0.0032\ cm^2$ $V = 100$ cm/second $d = 8.22\ gm/cm^3$ C = 0.10 calorie/gram° C $T_1 = 170°$ C $T_2 = 20°$ C so that the rotating surface is refrigerated to withdraw from the intermediate at least 400 calories per second.

* * * * *